US007716174B2

(12) United States Patent
Lee et al.

(10) Patent No.: US 7,716,174 B2
(45) Date of Patent: *May 11, 2010

(54) SYSTEM AND METHOD FOR PLANNING AND GENERATING QUERIES FOR MULTI-DIMENSIONAL ANALYSIS USING DOMAIN MODELS AND DATA FEDERATION

(75) Inventors: Juhnyoung Lee, Yorktown Heights, NY (US); Pietro Mazzoleni, Brivio (IT); Jakka Sairamesh, New York, NY (US); Maroun Touma, Redding, CT (US)

(73) Assignee: International Business Machines Corporation, Armonk, NY (US)

( * ) Notice: Subject to any disclaimer, the term of this patent is extended or adjusted under 35 U.S.C. 154(b) by 363 days.

This patent is subject to a terminal disclaimer.

(21) Appl. No.: 11/930,917

(22) Filed: Oct. 31, 2007

(65) Prior Publication Data
US 2008/0046419 A1 Feb. 21, 2008

Related U.S. Application Data

(63) Continuation of application No. 11/037,909, filed on Jan. 18, 2005, now Pat. No. 7,337,170.

(51) Int. Cl.
*G06F 7/00* (2006.01)
(52) U.S. Cl. .................. 707/600; 707/718; 707/760; 707/957; 707/971
(58) Field of Classification Search .................. 707/4
See application file for complete search history.

(56) References Cited

U.S. PATENT DOCUMENTS

| | | | | |
|---|---|---|---|---|
| 6,311,194 B1* | 10/2001 | Sheth et al. | ................. | 715/236 |
| 2002/0120618 A1* | 8/2002 | Ushijima et al. | ............... | 707/3 |
| 2002/0129032 A1* | 9/2002 | Bakalash et al. | ............ | 707/101 |
| 2004/0107155 A1* | 6/2004 | Yanosy | ....................... | 705/37 |
| 2004/0243595 A1* | 12/2004 | Cui et al. | ................... | 707/100 |
| 2005/0091238 A1* | 4/2005 | Zane et al. | ................. | 707/100 |

\* cited by examiner

*Primary Examiner*—Don Wong
*Assistant Examiner*—Binh V Ho
(74) *Attorney, Agent, or Firm*—Harrington & Smith

(57) ABSTRACT

Data integration and data analysis using computing equipment, software as well as hardware, includes a system and method for integrating data from various data sources, structured and unstructured, without physically creating a data warehouse and automatically generating queries for analysis of the integrated data from a multitude of different views.

12 Claims, 16 Drawing Sheets

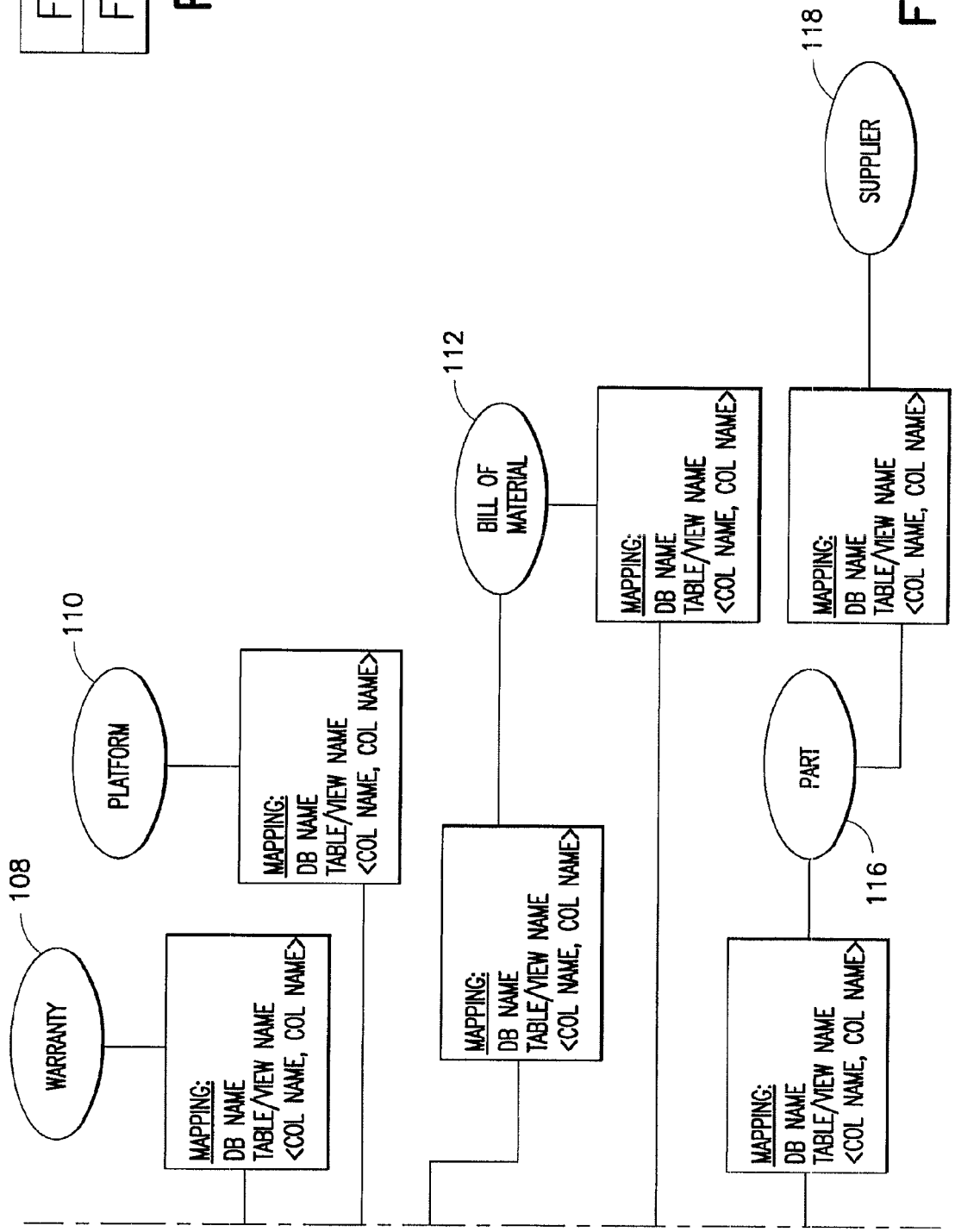

SYSTEM AND METHOD FOR PLANNING AND GENERATING QUERIES FOR MULTI-DIMENSIONAL ANALYSIS USING DOMAIN MODELS AND DATA FEDERATION

CROSS-REFERENCE TO A RELATED APPLICATION

This patent application is a continuation of U.S. patent application Ser. No. 11/037,909, now U.S. Pat. No. 7,337,170, filed on Jan. 18, 2005.

FIELD OF THE INVENTION

The present invention relates to data integration and data analysis using computing equipment, software as well as hardware, and, more particularly, to a system and method for integrating data from various data sources, structured and unstructured, without physically creating a data warehouse and automatically generating queries for analysis of the integrated data from a multitude of different views.

BACKGROUND OF THE INVENTION

In recent years, industry trends toward mergers and acquisitions has forced most OEMs to re-think their processes to account for the multitude of data sources used by the various corporate divisions within the enterprise for storing and manipulating product data, including the product bill of materials, parts catalog, diagnostic procedures and warranty claims as a partial list of the kinds of product data that exists.

Government regulations, rising production cost, shorter time-to-market are yet other reasons why companies are looking for a more adaptive and dynamic information technology (IT) infrastructure that would scale to the on-demand era for product life cycle management.

The complexity of the IT environment in the industrial manufacturing sector has grown exponentially over the years creating problems. Some attributes of these problems include:

The increasingly complex nature of the product itself as measured by the number of components that goes into the making of a product and the umber of configurations for each product. This translates into increased storage and processing capacities for managing the information associated with the product design that could be in the order of a terabyte for just one product model.

The lack of visibility across the product life cycle due to the disparity of data management systems used in the different stages of the design, development, manufacturing process and services after sales. A large number of heterogeneous systems that are in use throughout the extended enterprise create an artificial barrier for information sharing.

The product design is often organized in silos around specific product assemblies (in the case of automobiles, e.g., wing design, engine design, body structure design, interior design, etc) making it difficult to integrate data across multiple divisions. While the project team is often composed of a multi-disciplinary group of engineers, the IT tools remain too fragmented and specifically tailored to the organization or division that uses them the most.

In this environment, traditional approaches for data integration using data warehousing does not always scale well. A data warehouse is a copy of transaction data specifically structured for querying, analyzing, and reporting. A data warehouse can be normalized or denormalized. It can be a relational database, flat file, hierarchical database, object database, etc. Data warehouse data often gets changed. Data warehouses often focus on a specific activity or entity. Data warehouses are usually designed to meet the requirements of one specific application and are not easily extensible without tearing down and rebuilding the table schema. They provide a fixed view on the data and are not easily adapted to changing business needs such as when new suppliers are integrated into the value chain.

Furthermore, product data tends to be deeply hierarchical in nature and has associated semantics and access control procedures that are encapsulated within the data management system that hosts the information and cannot be easily exposed to external applications. In order to safeguard the integrity of the data that is owned by any given partner, the industry had traditionally resorted to product data exchange where each partner exports a subset of the data that is stored within its domain and shares the data with other partners by mean of data replication. This approach tends to be slow and costly as multiple iterations may be required to provide the information that is needed. The approach leads to data redundancy where multiple replicas of the same work product could exist within the extended enterprise and requires additional complexity for managing the life-cycle of the exchanged information.

As industry transforms its processes to better leverage the resources and know-how of the extended enterprise, a new approach based on data federation emerges as it promises to deliver on speed and accuracy, both of which are needed to quickly predict and pinpoint weaknesses in a product design and performance. Delivering on such a promise requires a better understanding of the semantic and data models that are prominently used in the industry.

In the following description the automotive industry will be used as an illustrative example of an application of the present invention. However, the invention is not to be construed as being limited solely to the automotive industry. A generic product structure is a hierarchical structure of generic concepts or functions such as the vehicle body structure or the vehicle hydraulic system. The generic product structure describes a logical aggregation of the vehicle assemblies and serves as a template for creating the detailed product structure. As such, the generic product structure can be used to define the common concepts (e.g., seats) that are shared among similar product classes (e.g., SUV and passenger cars).

An ontology is a specification of a conceptionalization. That is, an ontology is a description (like a formal specification of a program) of the concepts and relationships that can exist for an agent or a community of agents. A common ontology defines a vocabulary with which queries and assertions are exchanged among agents. A commitment to a common ontology is a guarantee of consistency, but not completeness, with respect to queries and assertions using the vocabulary defined in the ontology. An automotive vehicle ontology is an annotated meta model of the generic product structure, and processes that can execute against such structure. It augments the generic product structure with various relationships and dependencies that may exist between the different components but cannot otherwise be expressed in the generic product structure or the detailed product structure. For example, the generic product structure for a vehicle may contain a placeholder for the wheel assembly. The vehicle ontology augments this assertion by defining a "similar to" relationship between the wheel assembly of a sports same product class. One derived benefit of such ontological relation is to broaden the scope of the search to a wider set of data sources that otherwise would not have been considered.

The vehicle ontology provides the foundation for defining a common semantic model of the product structure with all the associated engineering processes that execute against the product structure as shareable business objects. FIG. 15 is a block diagram of one possible vehicle ontology.

Reducing warranty costs by conducting a deep failure analysis and improved claim processes have been identified as a strategic initiative by many in the automotive industry. While OEMs continues to strive to manage warranty payout while improving supplier recovery for failed parts, they recognize the value of proactive failure. identification. The objectives of these efforts are to reduce the cost of warranty through identification of warranty issues more quickly than has been previously achieved and thereby reducing costs; and enhancement of brand loyalty by demonstrating a commitment to the reliability and quality of products carrying the brand name.

Earl warning and failure analysis solutions focus on applying data mining and analytics against a wider set of data sources including warranty claims, call-center contacts, vehicle bills of materials, supplier parts catalog, suppliers' bulletins and other attributes for how and where the vehicle is used. The analytics aims at identifying trends, patterns, and abnormalities at an early stage and creating a knowledge model that can be used by the quality engineers to anticipate any major recall.

The present invention provides a system and method for planning and generating queries for multi-dimensional analysis across divisions in an entity using domain models and data integration.

SUMMARY OF THE INVENTION

A principal object of the present invention is therefore, the provision of a system and method for integrating (federating) data from various data sources, structured and unstructured.

An object of the present invention is the provision of a system and method for executing human-friendly queries over integrated data sources.

Another object of the present invention is the provision of a system and method for automatically planning and generating physical queries to integrated data sources from human-friendly queries.

A further object of the present invention is the provision of a system and method for analyzing integrated data sources from a multitude of views and dimensions without physically building a data warehouse and/or OLAP (data warehouse for analysis processing) data remodel (e.g., a star or snow-flake schema), which are traditional approaches to multi-dimensional analysis.

A still further object of the present invention is the provision of a system and method for creating semantic models for a domain for data integration and analysis.

A yet further object of the present invention is the provision of a system and method for generating and recording mappings between the semantic model and data sources.

A still another object of the present invention is the provision of a system and method for using a data federation system for structuring the access of data from unstructured data sources.

A yet another object of the present invention is the provision of a system and method for using a report system for generating reports for multi-dimensional analysis.

Further and still other objects of the present invention will become more clearly apparent when the following description is read in conjunction with the accompanying drawing.

DETAILED DESCRIPTION

Figure 1:
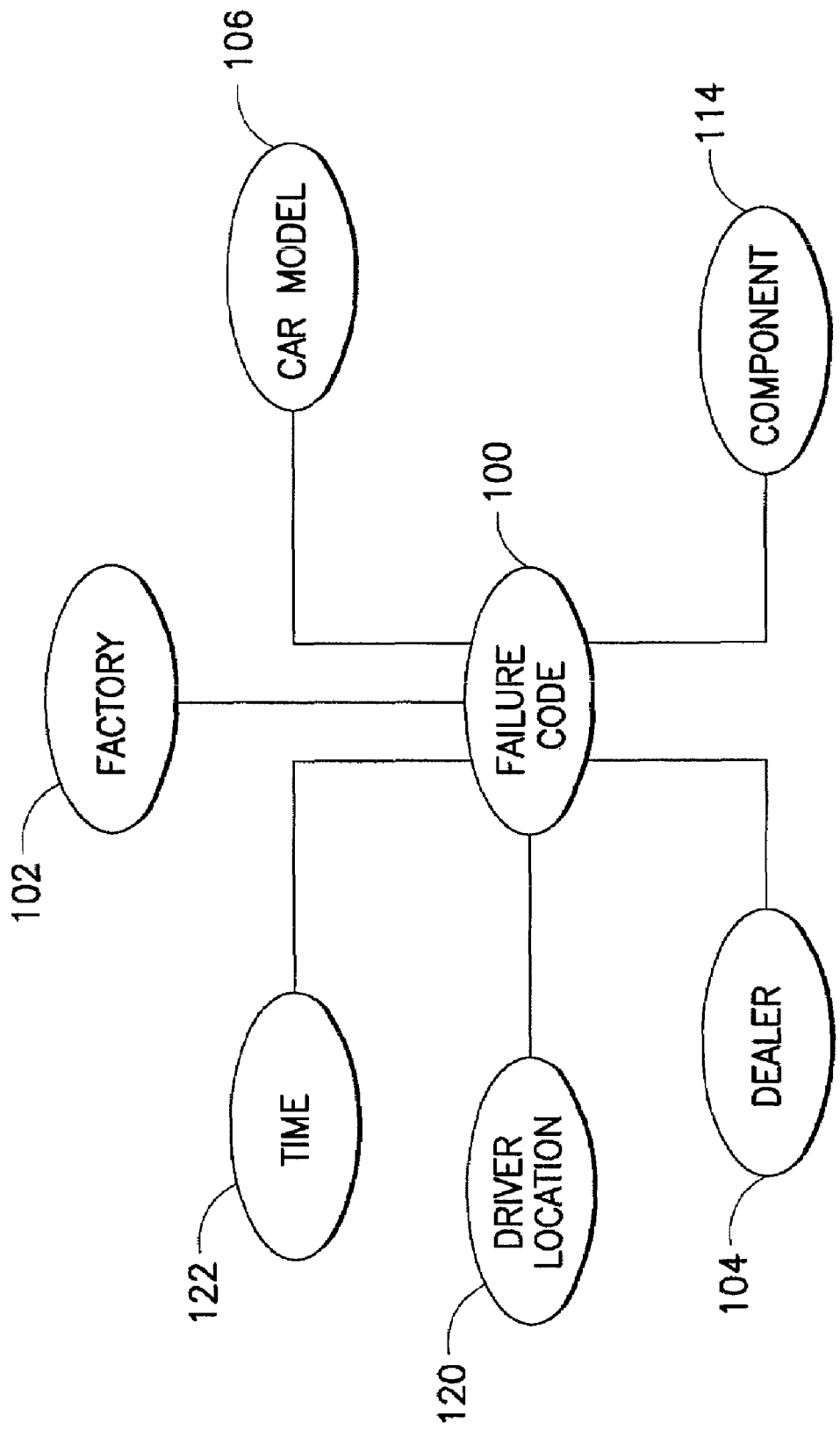
FIG. 1 shows a semantic model for automotive diagnostics.
Figure 2:
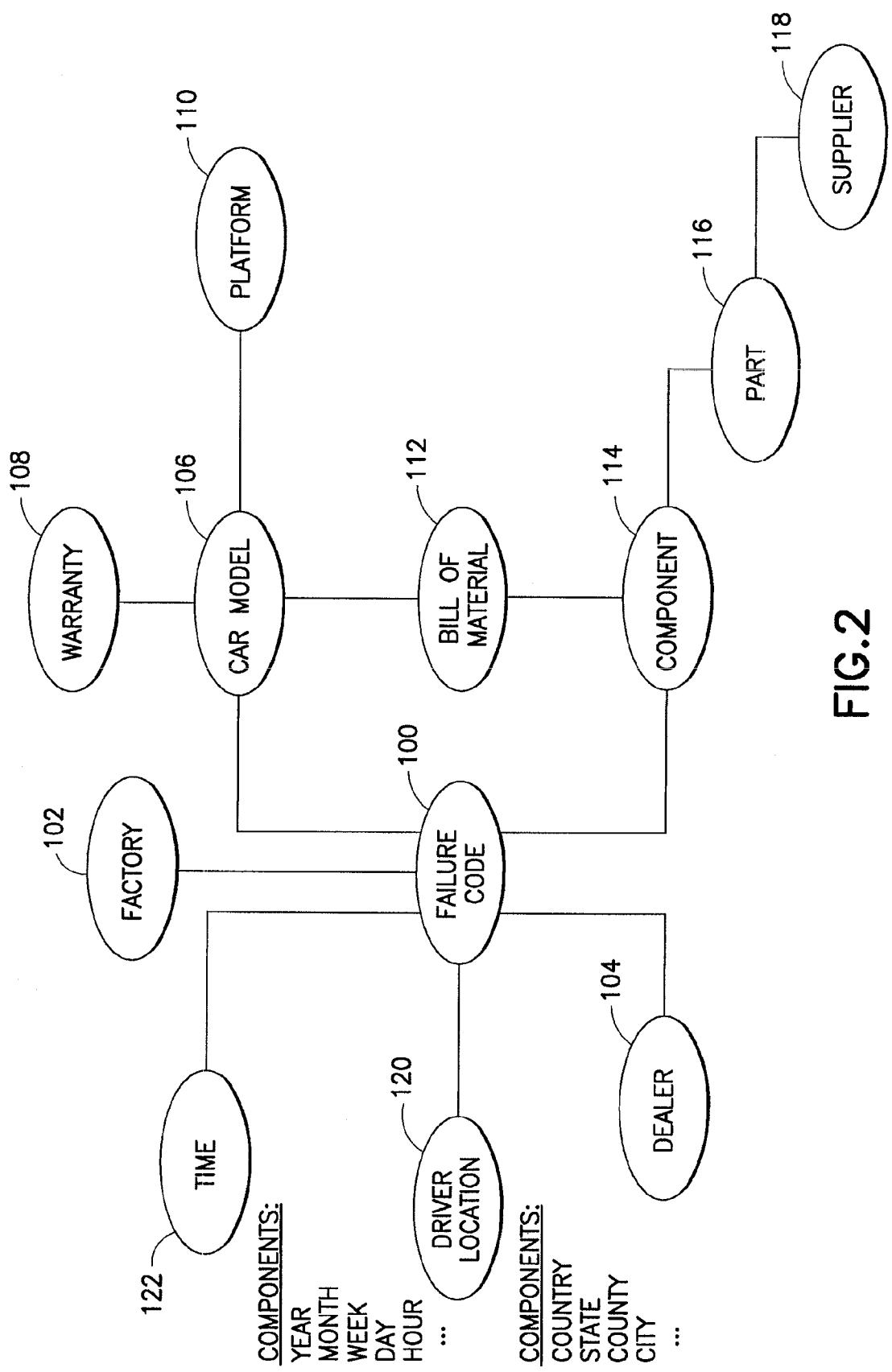
FIG. 2 shows an expanded semantic model for automotive diagnostics.

Referring now to the figures and specifically to FIGS. 1 and 2 there are shown a semantic model for automotive diagnostics and an expanded semantic model, respectively. A semantic model (ontology) is a formal explicit description of classes, i.e., concepts in a domain of discourse (e.g., automotive), properties of each class describing its attributes, relations with other classes being a special kind of properties (e.g., subclass, equivalentClass, etc.), properties of relations (e.g., transitive, symmetric, inverse, etc.), and constraints on properties (e.g., cardinality, etc.). Knowledge base often indicates a semantic model together with a set of individual instances of classes. The theoretical foundation of semantic models and technologies include logic (First Order Logic and Description Logic), knowledge representation of artificial intelligence (AI), and symbolic computation. The advantages of using semantic models include: (1) the models provide a means to express rich semantics of concepts and relations of domains, and (2) the models provide a means to query knowledge base with automated reasoning (inferencing).

FIG. 1 and FIG. 2 show a semantic model and an expanded semantic model related to an automotive diagnostic domain. It is to be understood that the automotive example is provided for illustrative purposes but the invention is not so limited. The invention is applicable for any application. At the center of the model, there is a concept representing a failure code 100. The failure code concept is connected via edges to various other concepts of the domains which contain information useful for identifying and isolating problems related to the failure code, including factory 102, dealer 104, car model 106, warranty 108, platform 110, bill-of-materials 112, component 114, part 116, supplier 118, and driver location 120. The model includes also generic concepts such as time 122. FIG. 1 shows only a partial model. It can be expanded in various ways by adding more related concepts and their properties. For instance, the model can be extended with a set of geography-related concepts that will be connected to the driver location concept 120. Also, different properties and constraints on classes and properties such as subClass, equivalentClass, transitive, symmetric, inverse, and cardinality can be used to represent various semantics. In FIGS. 1 and 2 time and driver location are expressed to have hierarchical structures.

Figure 3A:
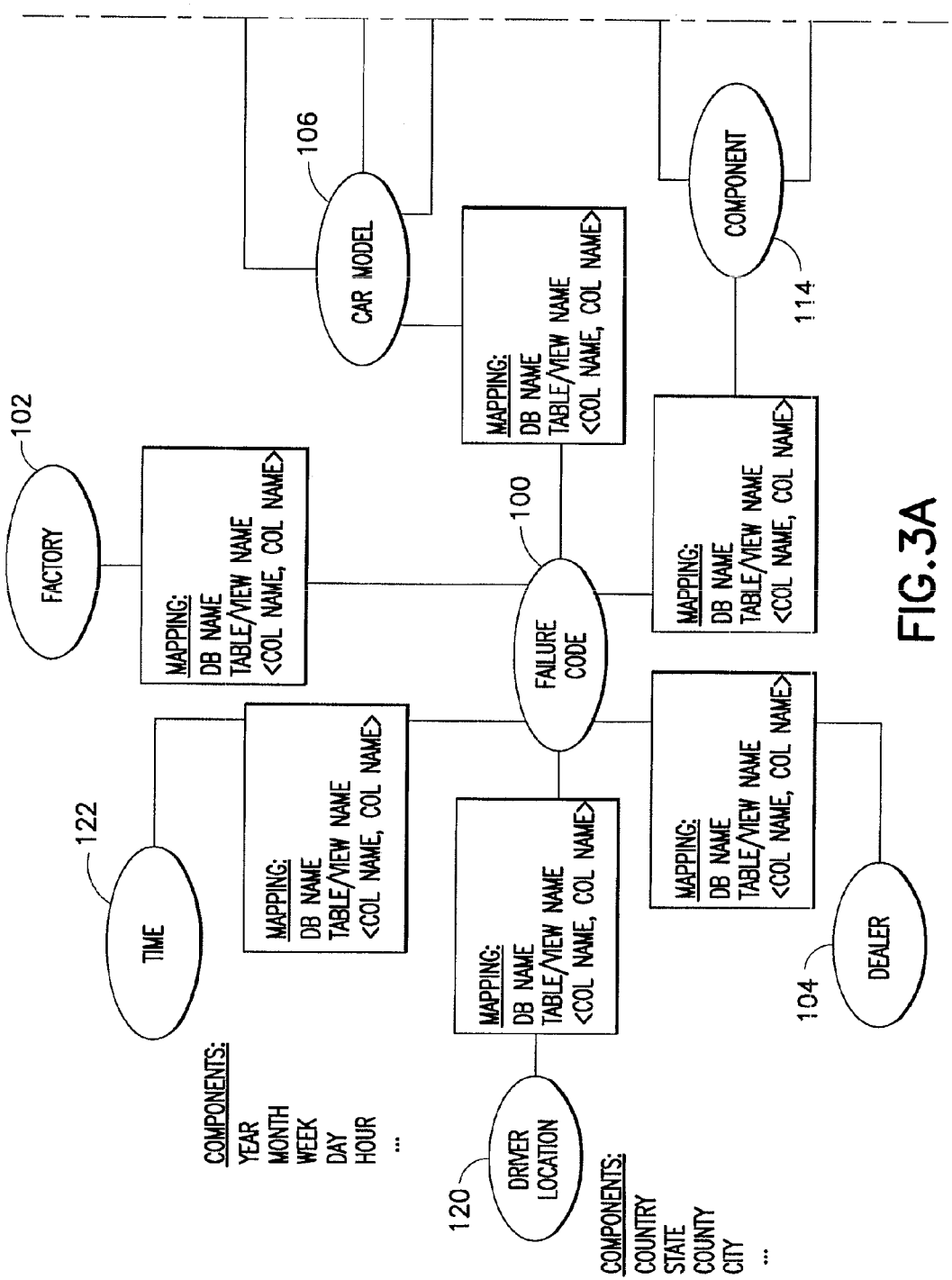
FIG. 3 shows a semantic model with mapping to data sources.

FIG. 3 shows a semantic model with mapping to data sources: The usefulness of semantic models themselves is limited because a model itself does not mean much without instances it represents. However, when semantic models are connected to various data sources which provide instances of concepts represented in the semantic models, they become very useful for various purposes. The models can be used to integrate various data sources; provide a means for users to use human-friendly, semantic queries to access information from the integrated data sources; automatically translate human-friendly, semantic queries to physical queries to real data sources underneath; and help users analyze information from the integrated data sources.

The first step in realizing all these benefits is to create a mapping between the semantic model and the underlying data sources. Unfortunately, this task is not straightforward, because often the structures of data sources vary drastically. It is also necessary to handle a multitude of data sources in an enterprise environment. Moreover, some sources do not have much structure (e.g., semi-structured or unstructured data). The mapping creation step is described below in conjunction with FIG. 7.

FIG. 3 shows the semantic model of an automotive domain with mapping information to data sources. In the figure each oval, i.e., concept, is associated with a respective box which represents a mapping to one or more columns in one or more tables (or table views) in one or more relational databases.

Figure 4:
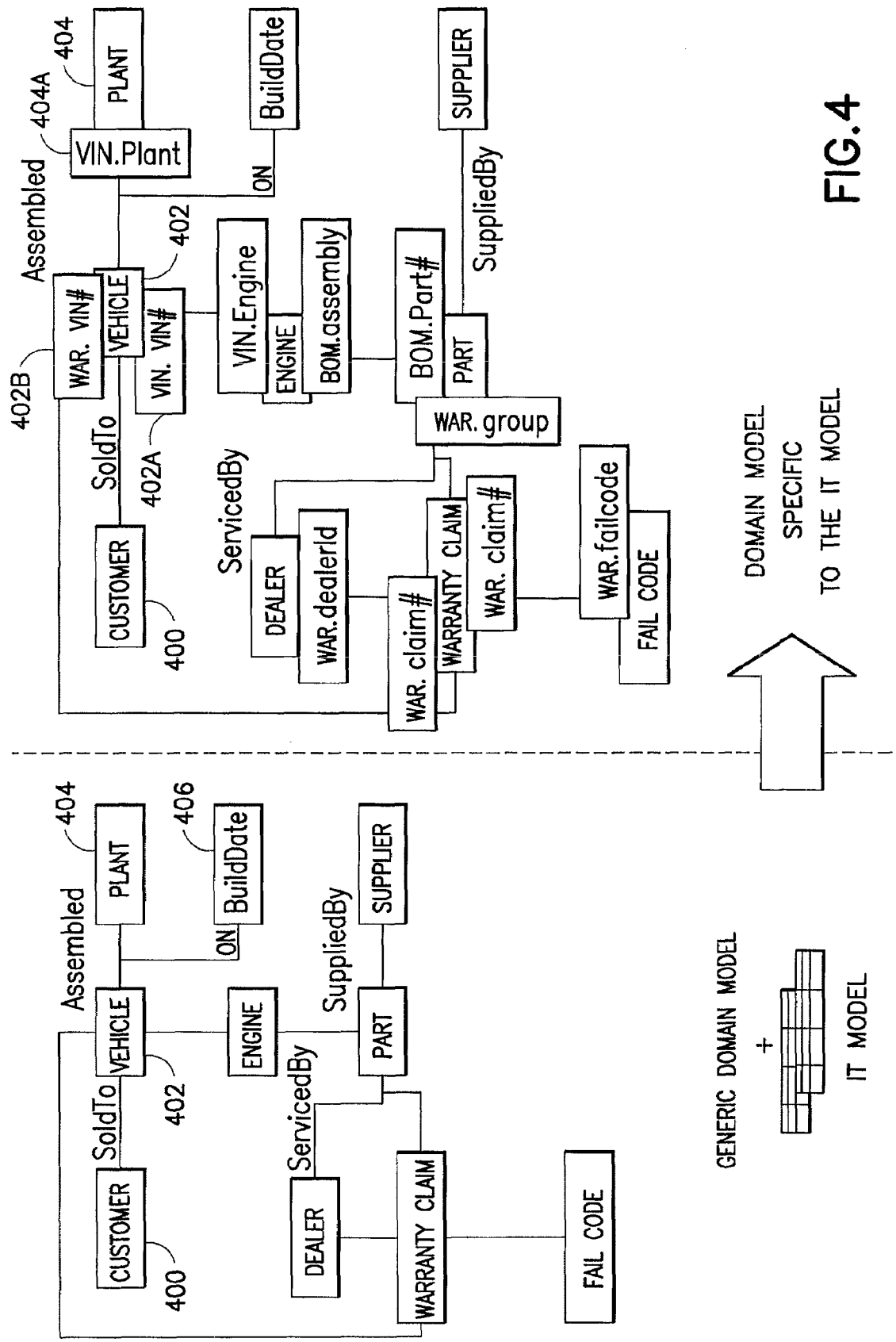
FIG. 4 shows a mapping of semantic model between a semantic model and an IT model with data sources.

FIG. 4 shows in more detail examples of the mapping information between the semantic model and the IT model (e.g., relational tables, flat files, spreadsheets, XML files, etc.). The semantic model is shown on the left-hand side of the figure. The right-hand side of the figure represents the semantic model associated with mapping information. Each relation of each class in the semantic model is associated with a box which represents one or more columns in one or more tables (or table views) in one or more relational databases. This mapping information is used to generate physical queries from semantic queries submitted by human users. For example, in the semantic model a customer 400 is sold a vehicle 402 which was manufactured at assembly plant 404 on build date 406. In the semantic model associated with the mapping information, vehicle 402 has associated with it a specific vehicle identification number 402A and warranty VIN number 402B. The plant 404 has associated with it a specific VIN number 404A for the vehicle 402, such as a particular assembly line where the vehicle was assembled.

Figure 5:
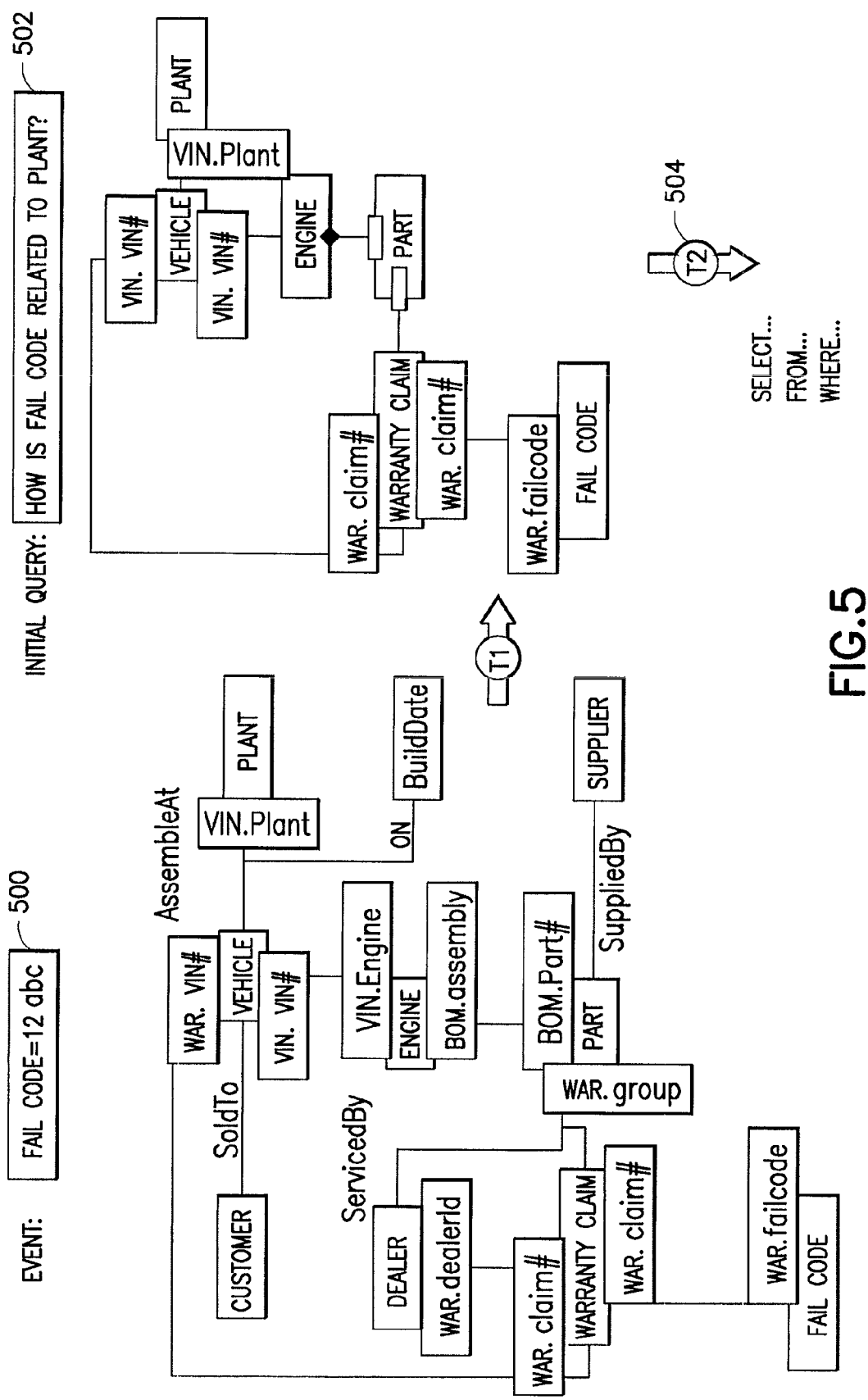
FIG. 5 shows schematically a method for generating a SQL query.

FIG. 5 shows a method for generating a SQL query illustrating an example of a semantic query and how the semantic query is translated into a physical query to a data source by using the mapping information associated with concepts and relations of the semantic model. The left-hand side of FIG. 5 corresponds to the right-hand side of FIG. 4. When an event such as a Fail Code=12abc 500 occurs, an initial query 502 is made "how is Fail Code related to Plant?". The result 504 is the VIN number of the plant where the Fail Code was generated.

Figure 6:
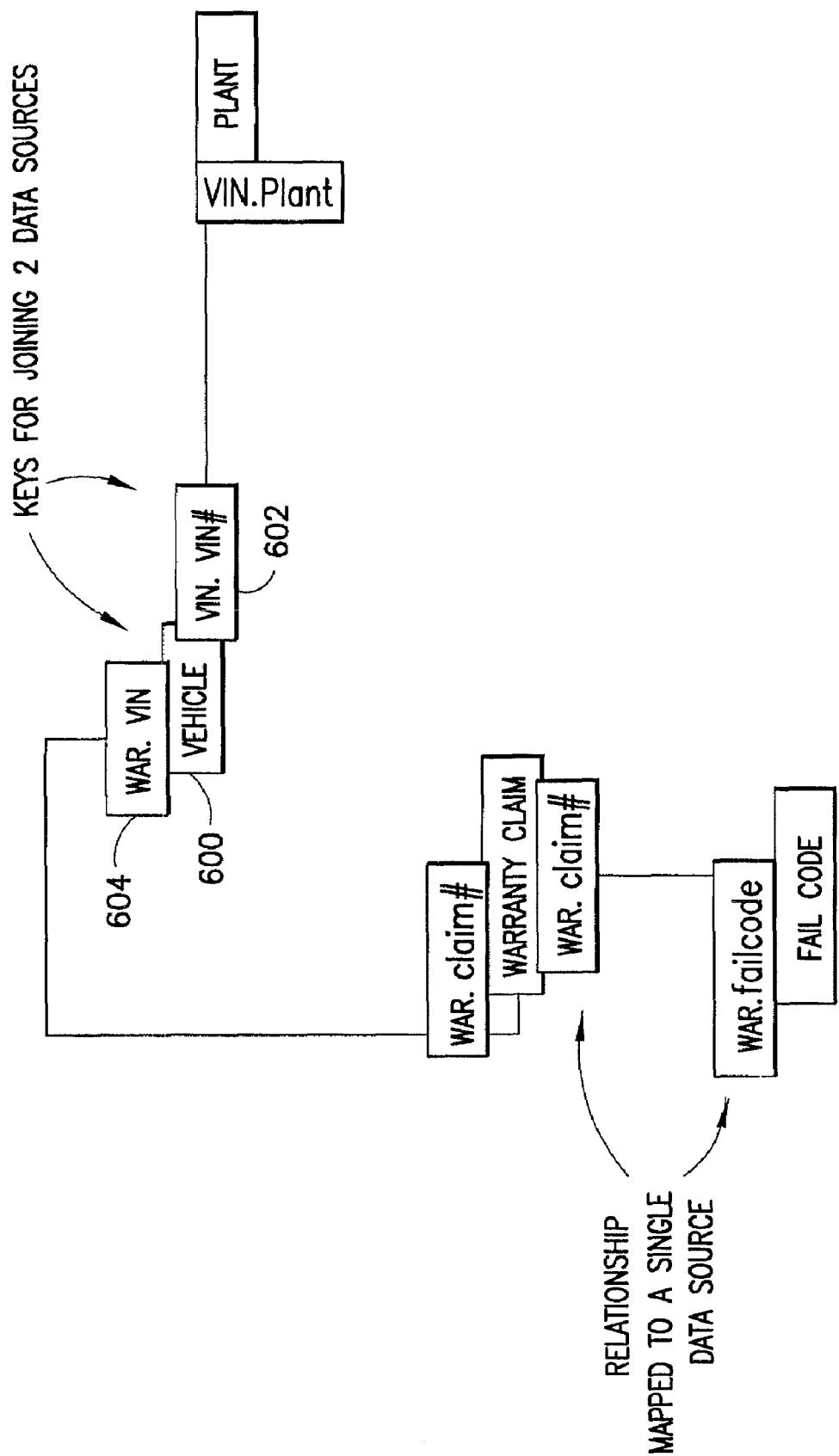
FIG. 6 shows schematically relationship types of classes in a semantic model.

FIG. 6 shows relationship types that each relation of each class in the semantic model, such as vehicle 600, is associated with boxes for vehicle identification number 602, and warranty identification number 604, which represents one or more columns in one or more tables (or table views) in one or more relational databases. This mapping information is used to generate physical queries from semantic queries submitted by human users.

Figure 7:
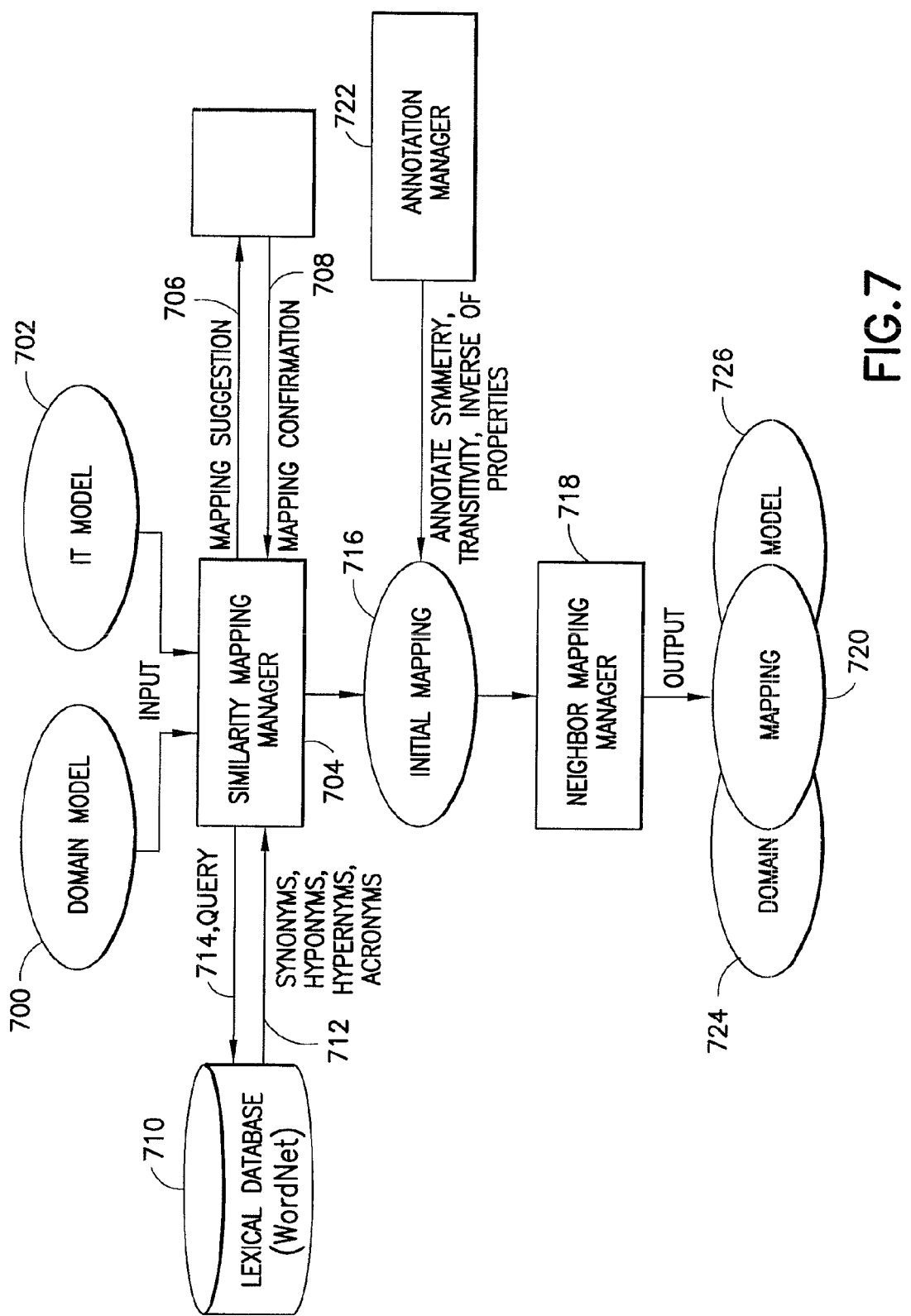
FIG. 7 shows a flow chart of a mapping algorithm.

FIG. 7 is a flow chart of a mapping algorithm. One method of (semi-) automating the mapping process between semantic models and IT models is to start with utilizing similarities in names in the domain model 700 and IT model 702. For example, if the domain model has a concept named phone number and the IT model has columns named phone, phone_num, phone_number, pnum, etc., there is a high chance that these columns can be mapped to the phone number concept in the domain model. However, the system should not map them automatically without human intervention. Rather, the similarity mapping manager 704 would suggest possible mapping of the concept and columns to the user 706, and let the user confirm the final mapping 708. In order to help identify possible mapping among variations of a same concept, it is possible to use some existing lexical database 710 such as WordNet, which provides sets of synonyms, acronyms, and other linguistic variations 712 to the query 714. If necessary, the system can provide a facility to add more such sets to the lexical database.

Once the initial mapping 716 is bootstrapped by utilizing naming similarities, then the system can make further mapping suggestions regarding neighboring concepts in neighbor mapping manager 718. For example, once the phone number concept in the domain model is mapped to the pnum column in a table in the IT model, the system can suggest that the address concept neighboring with the phone number concept be mapped to the addr column in the table. Again, the system would suggest the mapping 720 and a human makes the final mapping decision. In this way, the system can incrementally build mapping information by using prior mapping and human interaction. Also, after the mapping process, the user can add more semantics, if necessary, to the classes and properties in the model, such as symmetry, transitivity, inverse, etc. by means of an annotation manager 722. The final mapping yields a new domain model 724 and IT model 726.

Figure 8:
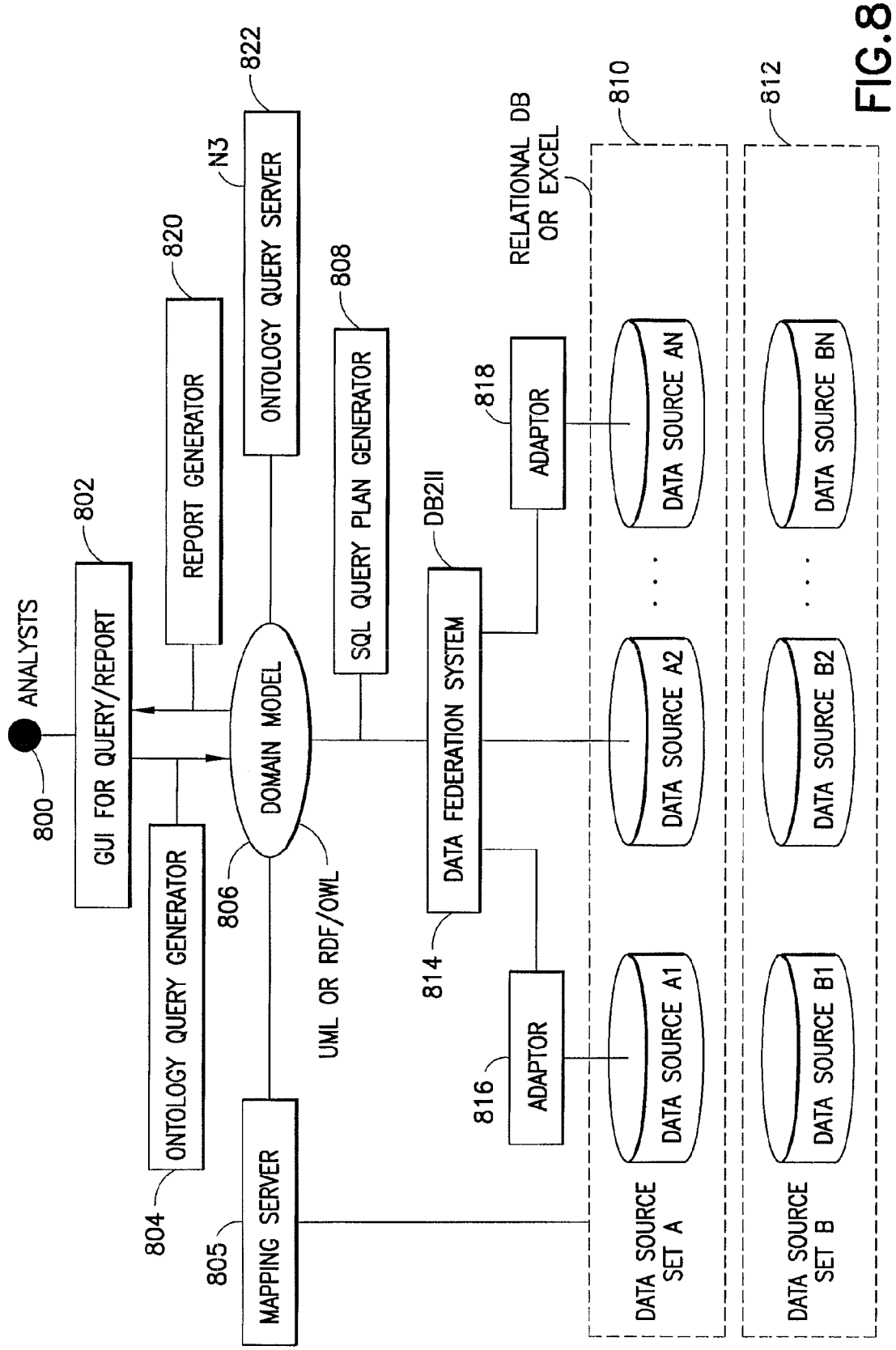
FIG. 8 shows a flow chart of a system architecture overview.

FIG. 8 is a flow chart of the system architecture overview showing the end-to-end steps of how a preferred embodiment of the invention works for the users. The Users 800 of the system are typically information analysts, for example, in the domain of automotive diagnostics, claim analysts who want to understand a particular set of automotive failures and how they are related with other dimensions of the automotive domain, e.g., warranty, manufacturing, assembly, geography, and the like. The user submits queries to find answers to such questions. Initially the query 802 is a natural language free form query that is not constrained by any form of underlying data stores. An ontology query generator 804 translates the human query to semantic queries that can be understood by the semantic model (domain model) 806. Still, the semantic query is not constrained by data store forms. The SQL query plan generator 808 uses the semantic model (domain model) 806 and the mapping information from mapping server 805 associated with concepts and relations of the domain model to generate a SQL query that is understood by relational database sources 810, 812. Not all the underlying data stores may be relational database stores that understand SQL query. A data federation system 814 such as IBM DB2II (Information Integration) solves that problem by making non-relational, semi-structured, unstructured data stores look like relational databases and understand SQL queries. Software components doing this job are often referred to as adaptors 816 and 818.

The database sources are located on one or more servers or alternatively, are located on the World Wide Web.

As explained above, one of the advantages of using semantic models is the ability to express rich semantics of concepts and relations, and use the semantics in answering queries providing automated reasoning and inferencing (based on logic). FIGS. 9 to 13 show some examples of such reasoning with semantic queries. The ontology query server supports the automated reasoning capability.

The query result returned by the data sources is federated by the data federation system 814, and then passed to the report generator 820, which can generate reports regarding various useful multidimensional analyses.

The mapping server 805 is a build-time tool described in conjunction with FIG. 7, which is used to create semi-automatically the mapping information between semantic models and IT models. The mapping server identifies tables/views (and columns defined in them) in the IT model that present relations in the domain model. It is possible to (semi-) automate the process by using some heuristics, machine learning and/or statistical approaches. The semantic model may be defined in terms of a domain tree. Also, if is possible to define some simple rules for creating joins when necessary.

The user (analyst) submits the query through Query GUI 802. The Ontology Query Generator 804 translates the submitted query to an ontology query in server 822 in N3 format. An example of a user query is as follows:
Show me all the dimensions of Failure Code.

And an example of an ontology query is as follows:
(FailureCode, hasDimension, ?X).

The Ontology Query Server 822 processes the query and returns a Result Set:
?X=Time, Driver Location, Dealer, Component, Car Model, Factory The Result Set is used by the SQL Query Plan Generator 808 to compose a SQL query. The Result Set can be shown to the user for selecting dimensions of interest for the composition.

The SQL Query Plan Generator 808 composes a SQL query by using the Result Set from Ontology Query Server 822 and Mapping information from Mapping Server 805. An example of a SQL query is as follows:

```
SELECT COUNT(FailureCode), Time, Component, CarModel, Factory
FROM table_list
WHERE FailureCode="XX" and join_conditions
[GROUP BY CarModel]
```

The GROUP BY dimension can be any dimension from the list. The query basically creates a cube view over aggregated counts of the given Failure Code. The query is submitted to data sources 810 and 812 via the Data Federation System 814 which retrieves data instances from the data sources. The retrieved data instances are displayed as a report by the Report Generator 820 (e.g., Alpha Blocks). The analyst reviews this report and decides on the next query, repeating the above steps.

Drill-down and roll-up is an important query type of OLAP along with aggregation. Ontology query can help compose drill-down and roll-up queries.

A user query example is as follows:
Show me all the granularities of Time class

An ontology query is:
(Time, hasComponents, ?X)

A Result Set is:
?X=Year, Month, Week, Day, Hour, . . .
The SQL Query Plan Generator 808 composes a SQL query by using the Result Set and Mapping information. The SQL query is:

```
SELECT COUNT(FailureCode), Month, Component, CarModel, Factory
FROM table_list
WHERE FailureCode="XX" and join_conditions
GROUP BY Month
```

The query is submitted to data sources 810 and 812 via the Data Federation System 814 (DB2II), which retrieves the data on the fly. Note that in traditional OLAP systems all the aggregation values are pre-computed.

The user continues the analysis by finding classes and data directly related to the given Failure Code. A user query example is:
Show me all the secondary dimensions of Failure Code An ontology query is:
(FailureCode, hasDimension, ?X) (?X, hasDimension, ?Y)

A Result Set is:
?X=Time, Driver Location, Dealer, Component, Car Model, Factory
?Y=Warranty, Platform, Bill Of Material, Part
The secondary dimensions can be used by the SQL Query Plan Generator 808 to compose a SQL query. The secondary dimensions along with direct dimensions can be shown to the user for selecting dimensions of interest for the composition. The SQL-Query Plan Generator composes a SQL query by using the Result Set and Mapping information. A SQL query is:

```
SELECT COUNT(FailureCode), Time, Warranty, Platform, Part
FROM table_list
WHERE FailureCode="XX" and join_conditions
GROUP BY Warranty
```

The user can simply move the focus of the analysis to a different class. A user query example is:
Show me all the dimensions of Component An ontology query is:
(Component, hasDimension, ?X)

A Result Set is:
?X=Failure Code, Part, Bill Of Material
The SQL Query Generator composes a SQL query by using the Result Set and mapping information. A SQL query is:

```
SELECT COUNT(FailureCode), Component, Part
FROM table_list
WHERE join_conditions
GROUP BY Part
```

Figure 9:
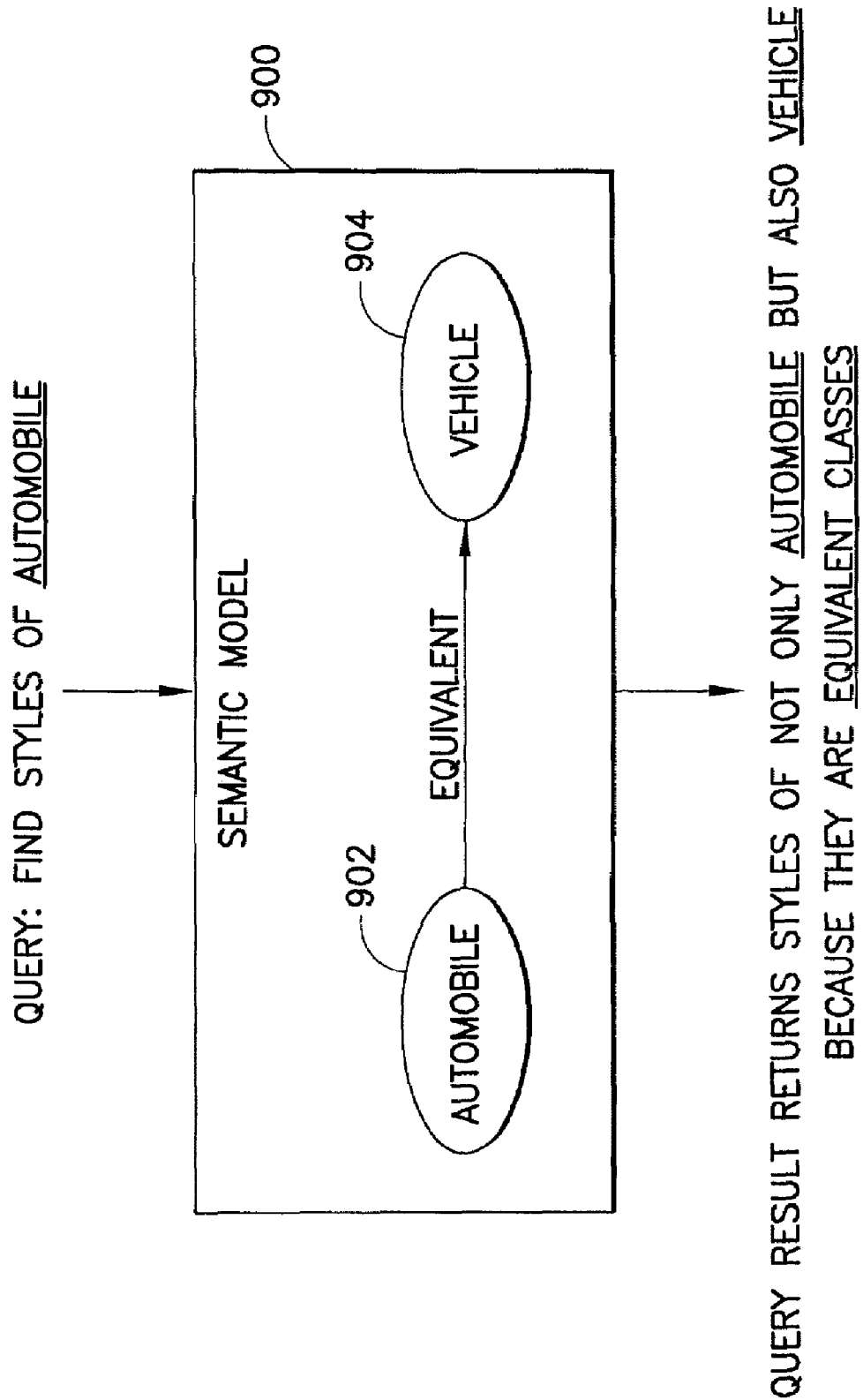
FIG. 9 shows semantic query and equivalence class.

FIG. 9 shows a semantic query and equivalence class. The present invention supports semantic queries by utilizing a "semantic network" for defining a domain model 900. Semantic networks specify relationships among concepts in the model and use the meaning (semantics) of the relationships in answering queries against the model. Examples of the relationships include generalization (superclass), specification (subclass), equivalence, symmetry, transitivity, and inverse properties of relationships. Certain prior art networks, such as Google and Yahoo, do not support such semantic queries.

FIG. 9 shows an example of an equivalence class. Suppose the user wants to find information (e.g., styles) about automobiles 902. Prior art systems yield a result which will display information only on automobiles 902. The present invention yields a result which will display information on automobiles 902 and vehicles 904, assuming the domain model defines automobile and vehicle to be equivalent concepts.

Figure 10:
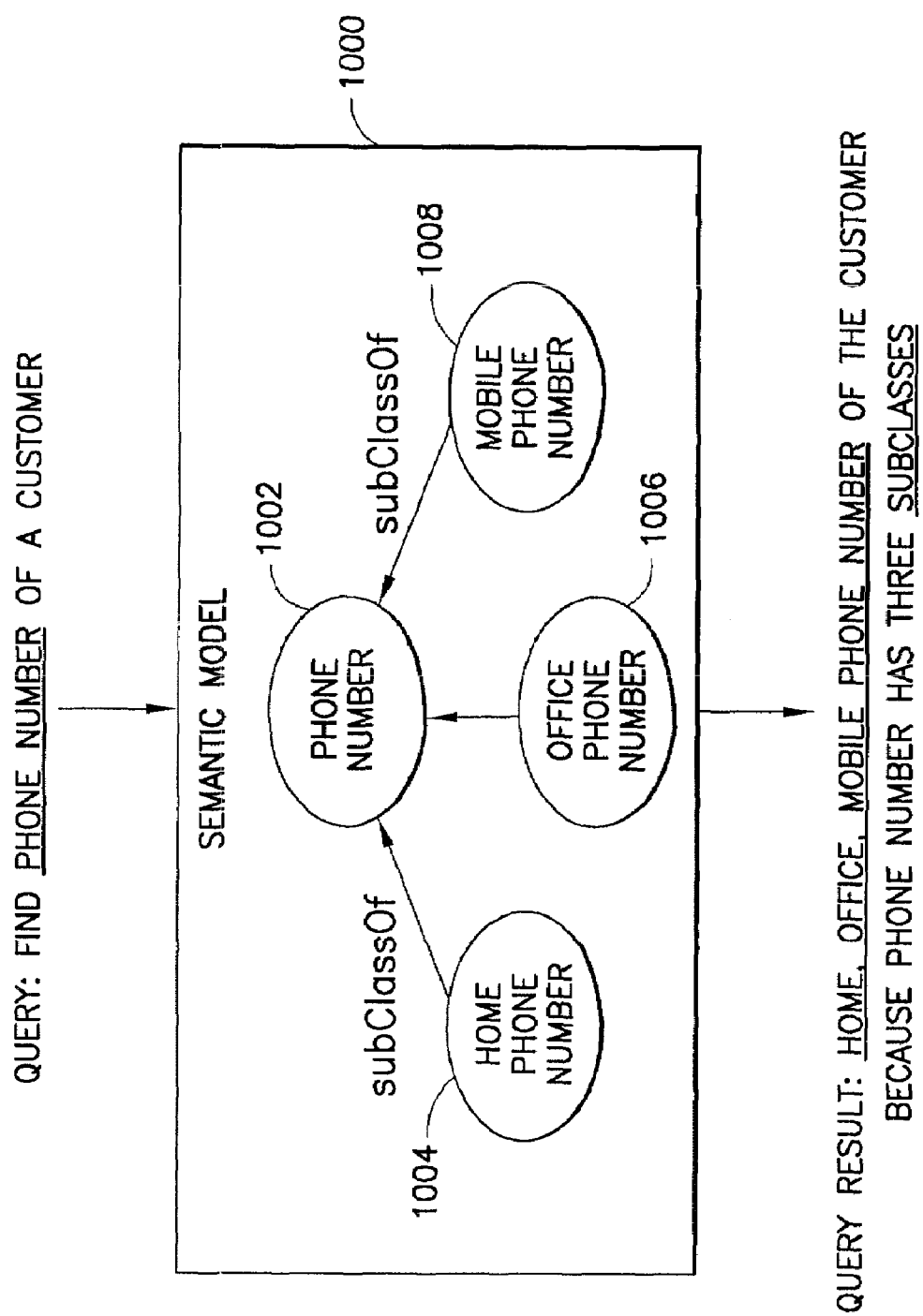
FIG. 10 shows a semantic query and subclass and a superclass.

FIG. 10 shows a semantic query and subclass and a superclass. Suppose the user wants to find phone number 1002 of a customer. Prior art systems look for only a phone number column in the table; and the result is a null if no such column exists in the table. The present invention looks for phone number, home phone number, office phone number, and mobile phone number to answer the query, assuming the domain model defines home/office/mobile phone numbers to be subclasses of phone number.

Figure 11:
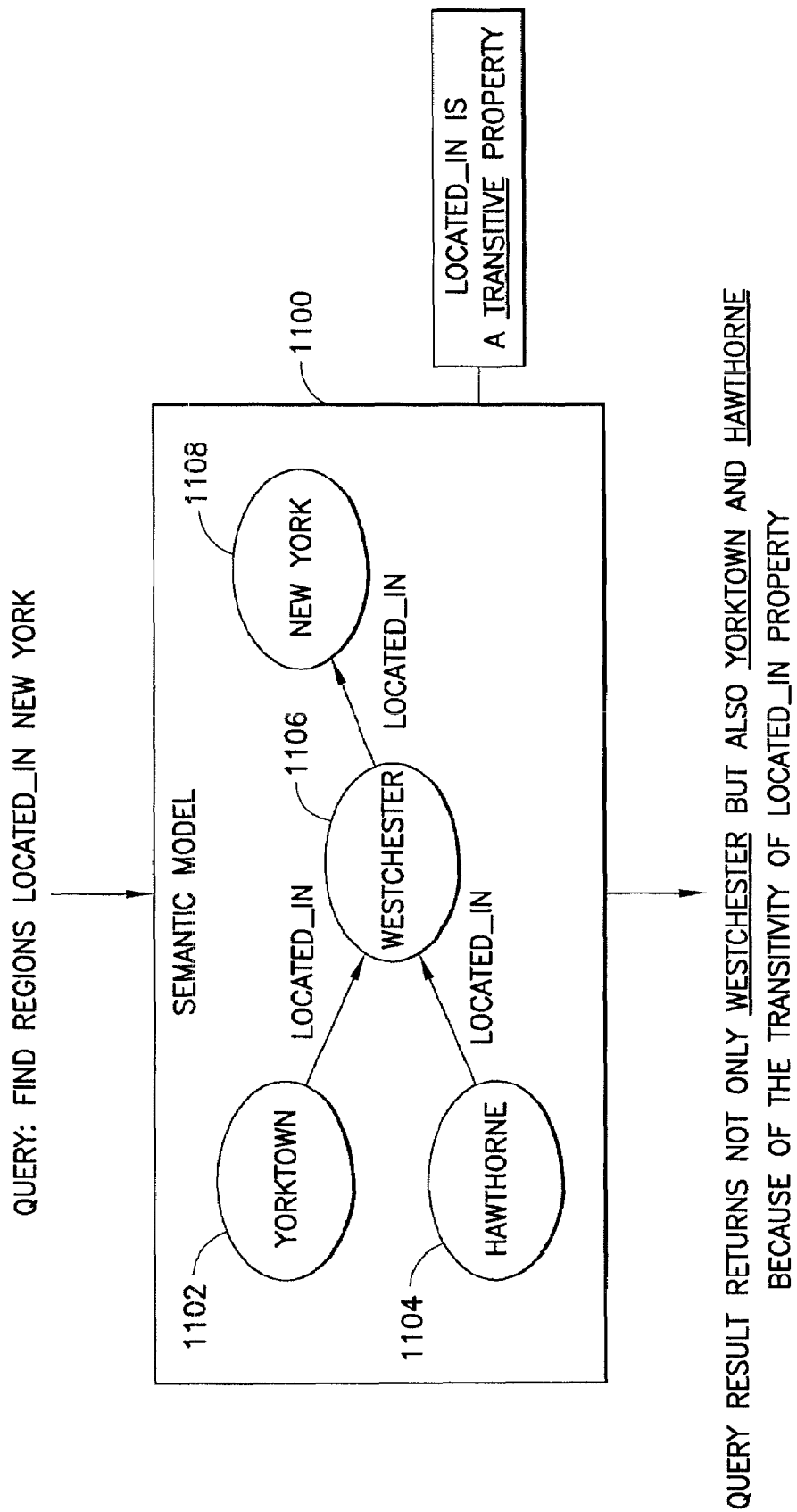
FIG. 11 shows semantic query and transitive property.

FIG. 11 illustrates a semantic query and transitive property. Assume the user wants to find regions located in New York. The semantic model 1100 can define the locations Yorktown 1102, Hawthorne 1104, Westchester 1106, and New York 1108 which are transitive properties. The data stores give instances such as Yorktown which is located in Westchester County and Hawthorne which is also located in Westchester County. Westchester County is located in New York. Then the query result returns not only Westchester but also Yorktown and Hawthorne because of the transitivity property.

Figure 12:
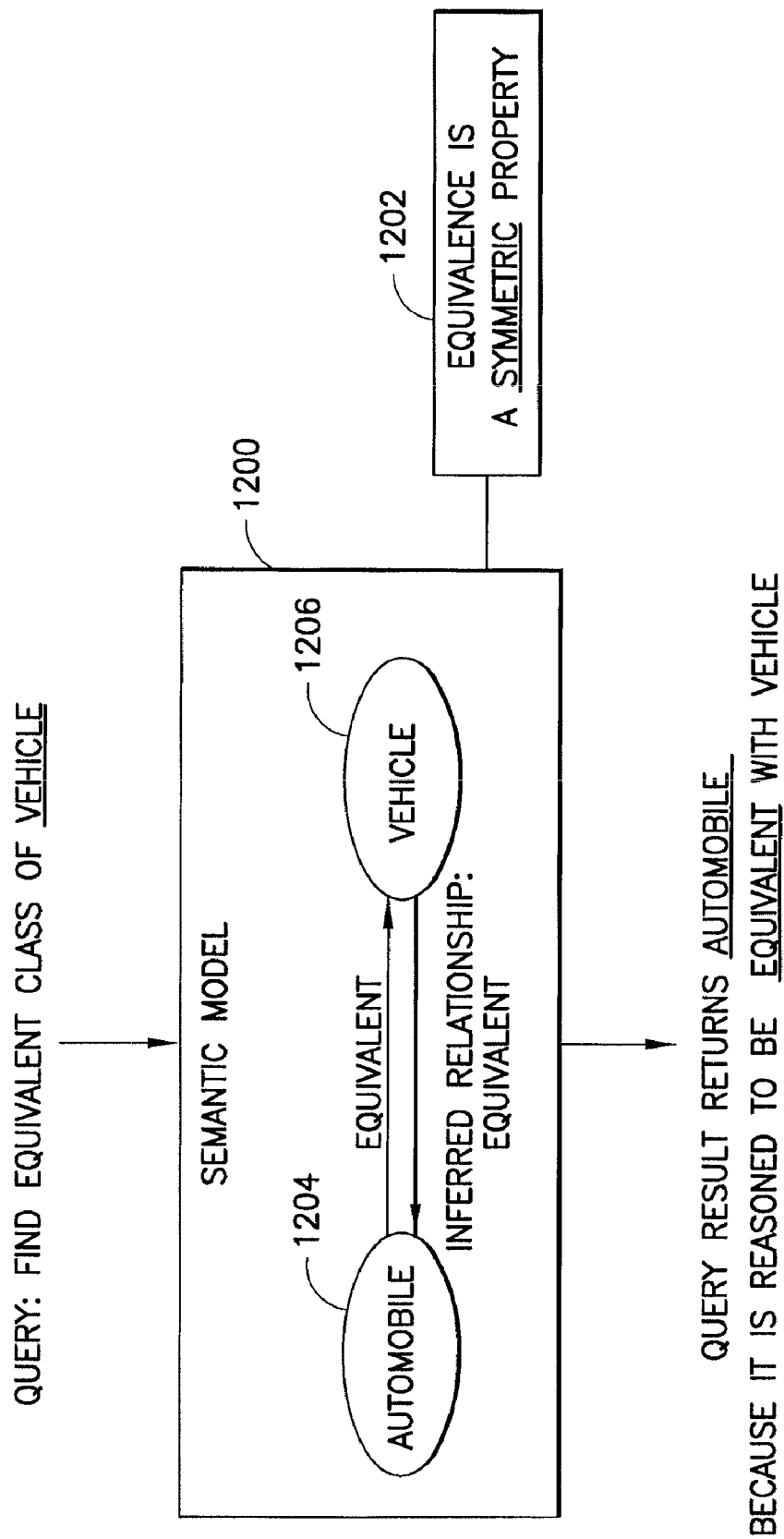
FIG. 12 shows semantic query and symmetric property.

FIG. 12 shows a semantic query and symmetric property. Assume the user wants to find equivalent classes of vehicles. Further assume that none of the data stores has this information explicitly. Also, assume that the semantic model 1200 defines that equivalence is a symmetric property 1202. Then, assuming the fact that automobile 1204 is equivalent to vehicle 1206 is defined in the semantic model 1200 as shown in FIG. 9, the new fact that a vehicle is equivalent to automobile is inferred from the semantic model by using that the knowledge equivalence is a symmetric property. Therefore, the query result returns automobile, because it is reasoned to be equivalent with vehicle.

Figure 13:
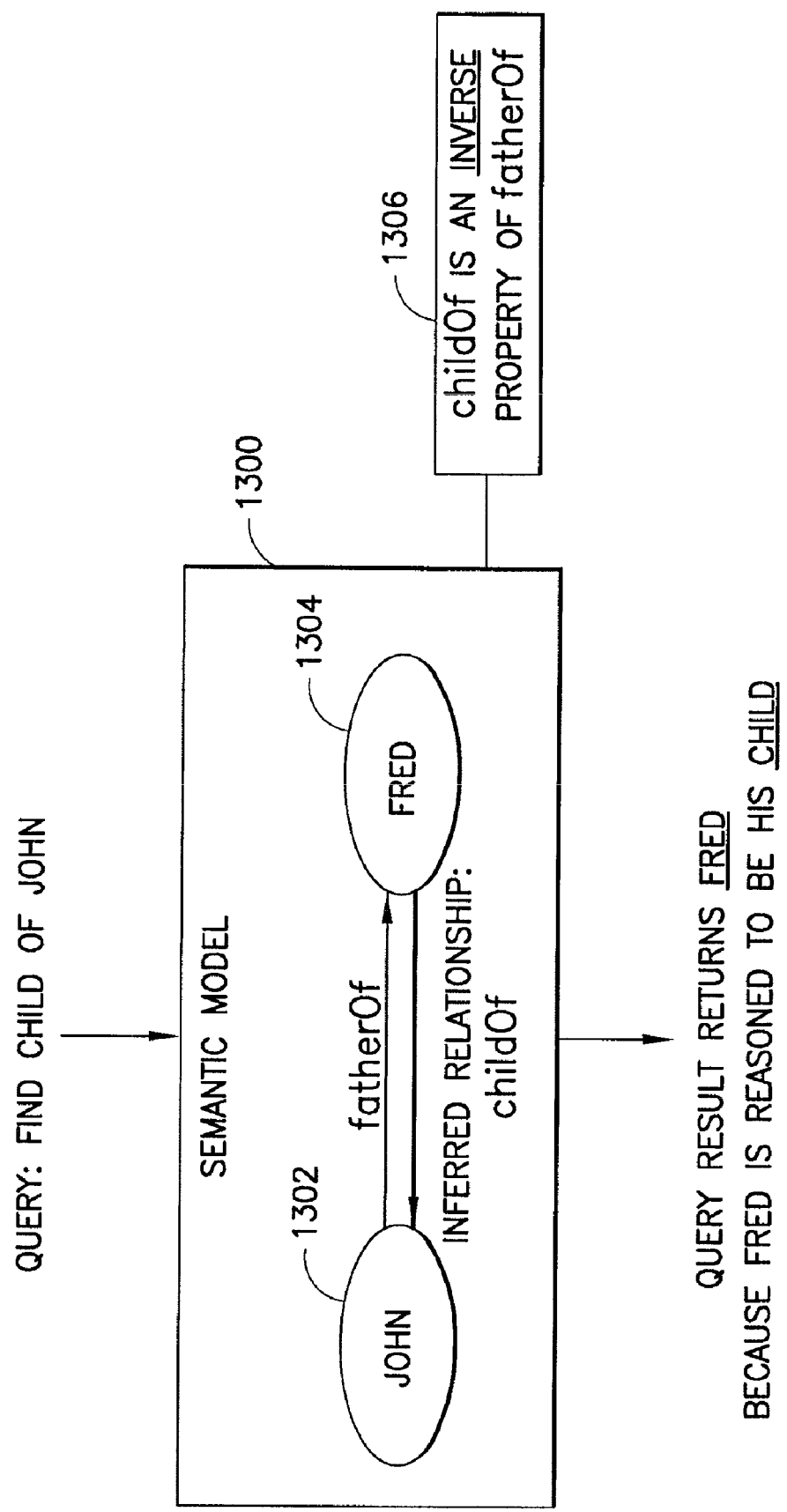
FIG. 13 shows semantic query and inverse properties.

FIG. 13 shows semantic query and inverse properties. Suppose the user wants to find a child of John when the underlying data stores only keep the fact that John 1302 is the father of Fred 1304. A query to find a child of John to the data stores cannot find an answer. The semantic model 1300 can be used to interpret the query. If the semantic model defines that "child of" is an inverse property of "father of" 1306, then an implied fact that Fred is child of John can be found. The query result returns Fred, because Fred is reasoned to be the John's child.

Figure 14:
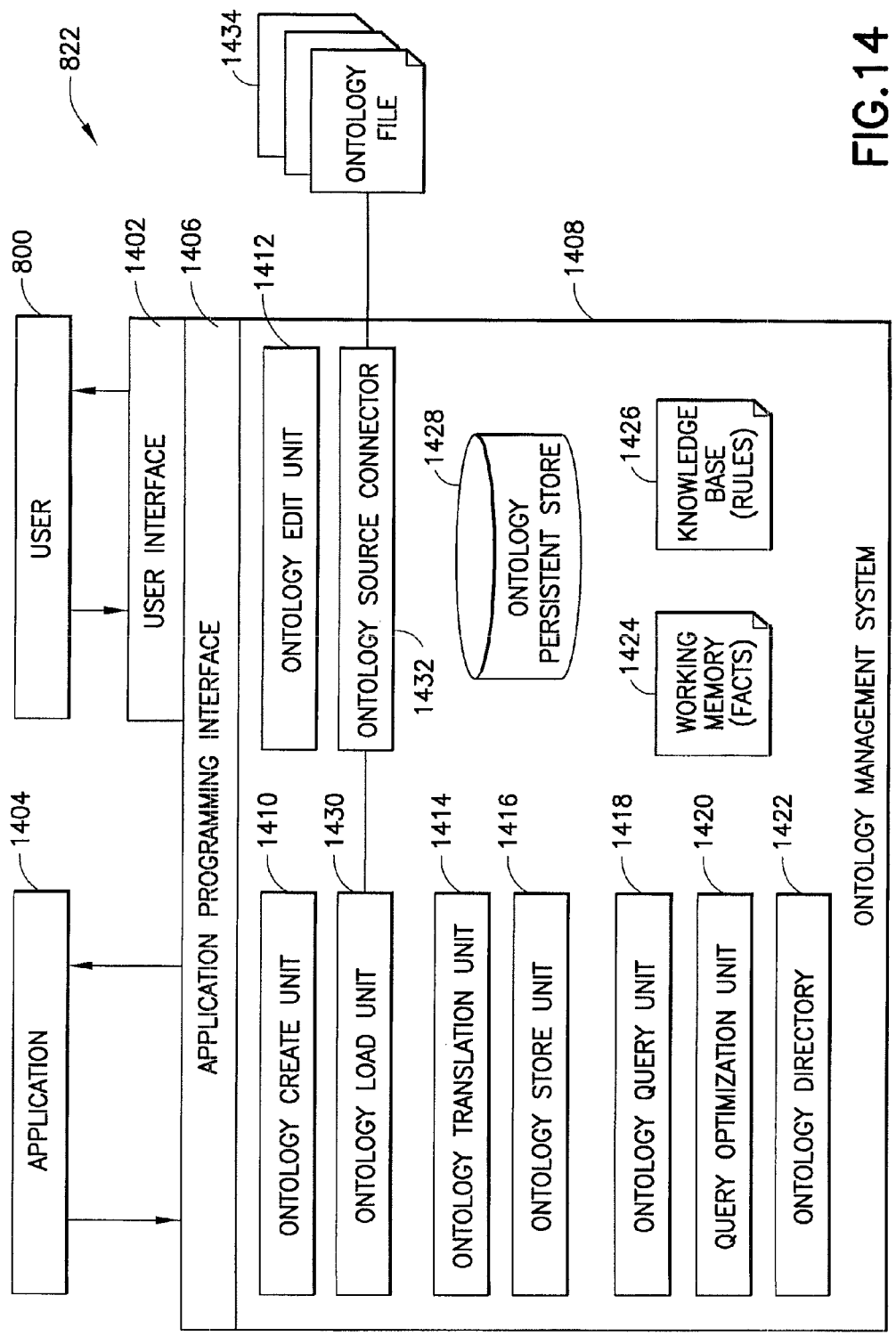
FIG. 14 is a schematic block diagram of an ontology query server shown in FIG. 8.
Figure 15:
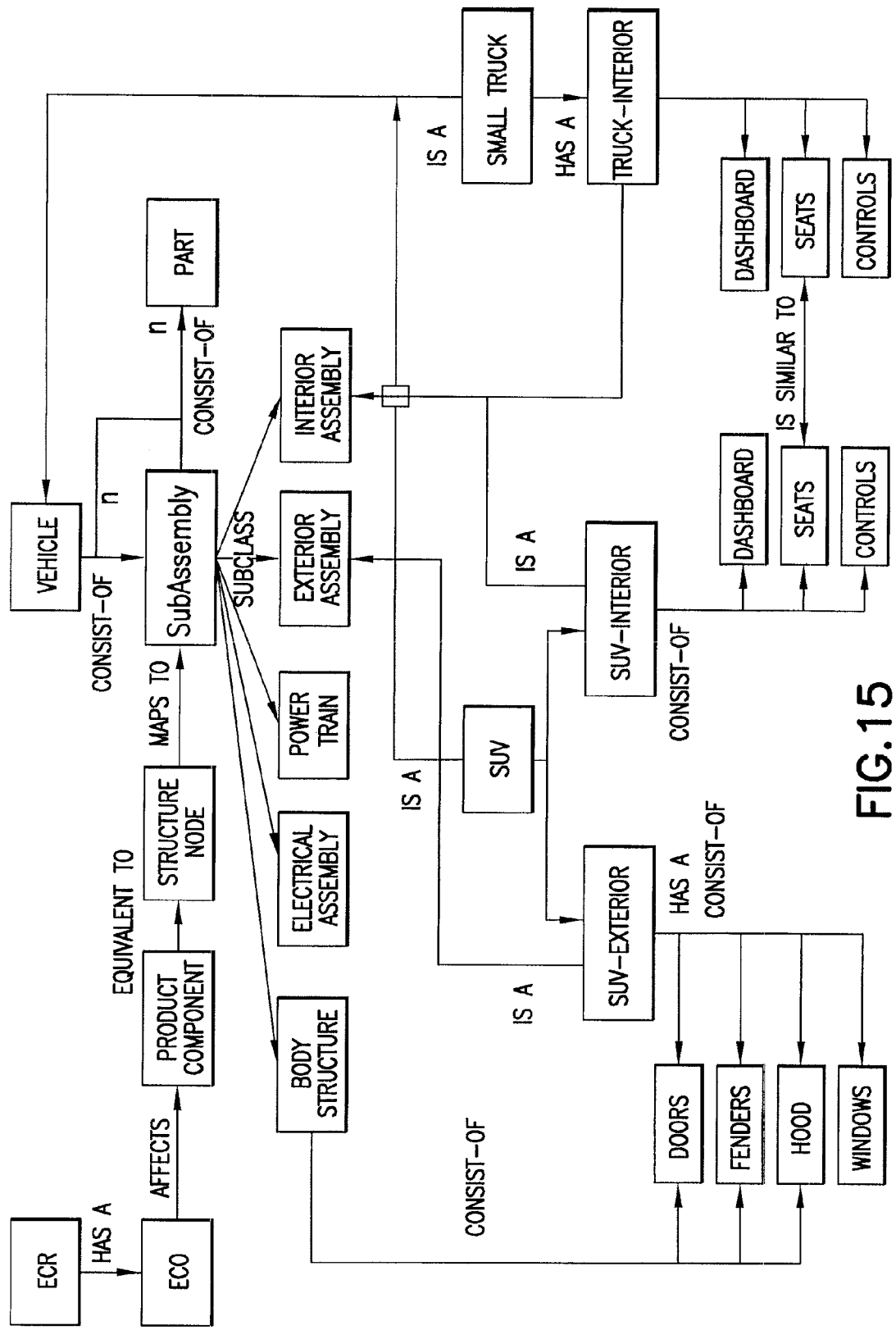
FIG. 15 is schematic block diagram of an ontology model for a vehicle.

FIG. 14 is a schematic block diagram of ontology query server 822. A user 800 submits a query to user interface 1402. An application 1404 is submitted to an application programming interface (API) 1406. The user interface 1402 is also connected to API 1406. Ontology management system 1408 contains ontology create unit 1410, ontology edit unit 1412, ontology translation unit 1414, ontology store unit 416, ontology query unit 1418, query optimization unit 1420, and ontology directory 1422. In addition, the system 1408 includes a working memory 1424 and a rules base 1426. Moreover, ontology persistent store 1428 memory is contained in system 1408. An ontology load unit 1430 is connected to ontology source connector 1432 which, in turn, provides as the system output ontology files 1434. In other words, the units within system 1408 interoperate to process user query inputs according to the selected application and ontology rules base in order to provide the ontology files output.

It will be understood by those skilled in the art that while the above description refers to the automotive industry in examples in describing the invention, the invention is not so limited and is applicable to any situation where there is a use for planning and generating queries for multi-dimensional analysis of data.

While there has been described and illustrated a system and method for planning and generating queries for multi-dimensional analysis using domain models and data federation, it will be apparent to those skilled in the art that modifications and variations are possible without deviating from the broad teachings and spirit of the present invention which shall be limited solely by the scope of the claims appended hereto.

What is claimed is:

1. A system for planning and generating database queries using a multitude of data sources in various formats and media, which enables multi-dimensional analyses without physically building a data warehouse, the system comprising:
    a memory;
    a domain model which provides a formal description of a domain of interest, comprising classes which are concepts in a domain of discourse, properties of each class describing its attributes including its relations with other classes and constraints on properties in the classes;
    a mapping server which generates a domain model specific to a set of data sources by specifying mapping between entities in said domain model and entities in the data sources;
    an ontology query generator which translates one or more queries in a natural language format to generate one or more ontology queries which can be understood in terms of said domain model;
    an ontology query server which infers one or more answers to ontology queries by reasoning with said domain model;
    a SQL query plan generator which composes one or more query plans using a standard query language for relational databases for multi-dimensional analysis including one or more of data grouping, roll-up and drill-down, pivoting, and changing the focused class of the current multi-dimensional analysis;
    a data federation system which builds one or more adaptors for individual data sources which make data sources appear as relational databases and allow them to be accessed by using a standard query language for relational databases and which also optimizes query plans for performance and processes queries to retrieve data from one or more data sources; and
    a report generator which provides data retrieved from data sources for multi-dimensional analysis.

2. A system for planning and generating database queries as set forth in claim 1, where said report generator provides data retrieved from data sources as a display for a user on a graphical user interface.

3. A system for planning and generating database queries as set forth in claim 1, where a domain model specific to a set of data sources is a domain model augmented with mapping information between entities in the domain model and entities in the data sources.

4. A system for planning and generating database queries as set forth in claim 1, where multi-dimensional analysis includes: one or more multi-dimensional views on a fact data class across its dimensions; aggregation on the fact data class; roll-up and drill-down operations on one or more dimensions by using one or more hierarchical organizations of the dimension data; extended analysis to one or more dimensions of the current dimensions; and change of the current fact data class to another class in the domain model.

5. A system for planning and generating database queries as set forth in claim 1, where said mapping server automatically determines mapping information between entries in the domain model and entries in data sources by using one or more of machine learning, heuristics, and statistical techniques applied to instance data.

6. A method for planning and generating database queries for multi-dimensional analysis using domain models and data federation comprising the steps of:
- creating a domain model for a domain of discourse to support multi-dimensional analysis;
- mapping between entities in the domain model and entities in data sources;
- building one or more adaptors for individual data sources which make data sources appears as relational databases and allow the data sources to be accessed by using a standard query language of relational databases;
- composing one or more queries for multi-dimensional analysis;
- translating the one or more queries in a natural language and generating one or more ontology queries which can be understood in terms of the domain model;
- inferring one or more answers to the ontology queries by using a reasoning component and the domain model;
- composing one or more SQL query plans for multi-dimensional analysis including one or more data grouping, roll-up and drill-down, pivoting, and changing the focused class of the current multi-dimensional analysis;
- submitting the SQL query plans to a data federation system for processing and retrieving data from one or more data sources; and
- providing the retrieved data for multi-dimensional analysis.

7. A method for planning and generating database queries for multi-dimensional analysis as set forth in claim 6, further comprising optimizing the query plans for improved performance.

8. A method for planning and generating database queries as set forth in claim 6, where said providing the retrieved data comprises displaying the retrieved data for a user on a graphical user interface.

9. A method for planning and generating database queries as set forth in claim 8, further comprising the user interacting with the retrieved data and composing one or more subsequent queries in a natural language for iteratively providing subsequent queries.

10. A memory storing a program of machine-readable instructions executable by a digital processing apparatus to perform operations for planning and generating database queries for multi-dimensional analysis using domain models and data federation, the operations comprising:
- creating a domain model for a domain of discourse to support multi-dimensional analysis;
- mapping between entities in the domain model and entities in data sources;
- building one or more adaptors for individual data sources which make data sources appears as relational databases and allow the data sources to be accessed by using a standard query language of relational databases;
- composing one or more queries for multi-dimensional analysis;
- translating the one or more queries in a natural language and generating one or more ontology queries which can be understood in terms of the domain model;
- inferring one or more answers to the ontology queries by using a reasoning component and the domain model;
- composing one or more SQL query plans for multi-dimensional analysis including one or more data grouping, roll-up and drill-down, pivoting, and changing the focused class of the current multi-dimensional analysis;
- submitting the SQL query plans to a data federation system for processing and retrieving data from one or more data sources; and
- providing the retrieved data for multi-dimensional analysis.

11. A memory storing a program of machine-readable instructions executable by a digital processing apparatus to perform operations for planning and generating database queries for multi-dimensional analysis using domain models and data federation as set forth in claim 10, further comprising the operation of optimizing the query plans for improved performance.

12. A memory storing a program of machine-readable instructions executable by a digital processing apparatus to perform operations for planning and generating database queries for multi-dimensional analysis using domain models and data federation as set forth in claim 10, where the operation of providing the retrieved data for multi-dimensional analysis comprises the operation of displaying the retrieved data for a user on a graphical user interface.

* * * * *